Oct. 22, 1935.  P. M. BOURDON  2,018,598
MOUNTING OF TWIN TIRED WHEELS
Filed May 9, 1933

Inventor
Pierre Marcel Bourdon
Wilkinson & Mawhinney
Attorneys.

Patented Oct. 22, 1935

2,018,598

UNITED STATES PATENT OFFICE 2,018,598

MOUNTING OF TWIN TIRED WHEELS

Pierre Marcel Bourdon, Paris, France, assignor to Michelin et Cie., Clermont-Ferrand, France, a corporation of France Application May 9, 1933, Serial No. 670,171
In France March 22, 1932

1 Claim. (Cl. 152—36)

The present invention relates to improvements in the mounting of twin tired wheels, and is an improvement over my prior similarly entitled application filed in the United States Patent Office February 25, 1933, Serial No. 658,627 which matured as Patent No. 1,996,140, April 2, 1935.

In common with my prior application above referred to, the present invention has for an object to provide a yieldable mounting whereby the two tires may conform to the road and equally bear the load.

The invention further aims to balance the weight supported by the two tires in a manner to make uniform the wear of the tires, particularly pneumatic tires.

A further object of the invention is to provide means to exclude dust, dirt and other foreign matter from the interior parts of the wheeled mounting, and at the same time not to interfere with the flexible action of such mounting.

With the foregoing and other objects in view, the invention will be more fully described hereinafter and will be more particularly pointed out in the claim appended hereto.

Figure 1:
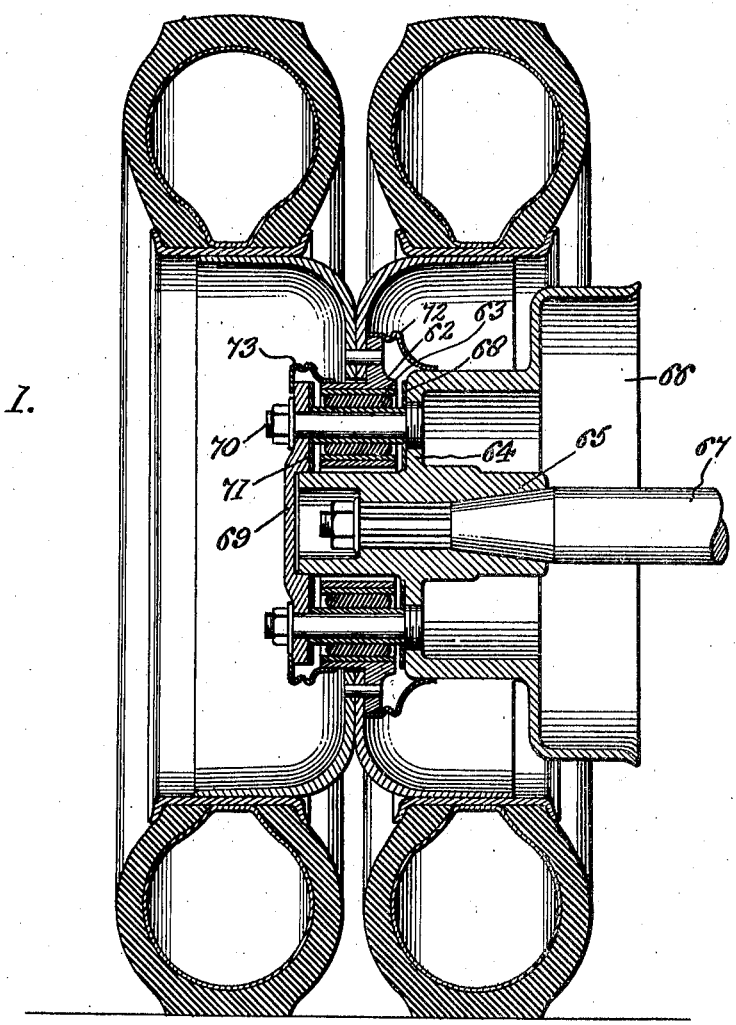
Figure 2:
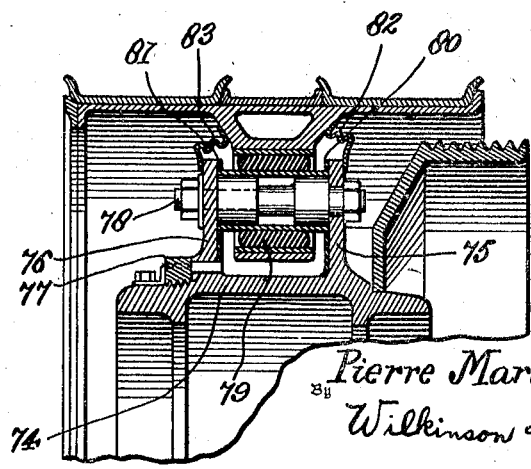

In the drawing, wherein like symbols refer to like or corresponding parts throughout the several views, Figure 1 is a vertical section taken through an axle, brake drum and twin tired wheel structure according to the present invention; and Figure 2 is a fragmentary vertical cross-section showing a modified form of the invention.

Referring more particularly to the drawing, at 62 is shown an annular outer part to which the two rims are rigidly secured and which forms with the rims the rim assembly. Such rim assembly is adapted to oscillate laterally on the rubber sleeves 63, whereby to permit the twin tires to conform to camber, curvature and irregularities in the road surface. The hub flange is indicated at 64 and is connected with the hub 65. The hub flange may also carry the brake drum 66. The axle is indicated at 67.

The hub flange 64 extends outwardly from the hub in proximity to the inner end portions of the rubber sleeves 63 and to the annular member 62 and it is provided with a face or wear plate 68 acting as an abutment to limit the rocking movement of the ring or annular member 62 in a transverse direction at the inner side of such annular member. A removable cap 69 is affixed outwardly on the hub and over the bolts 70 which pass through the rubber sleeves 63 and through the hub flange. Such cap plate 69 has facings or a wear plate 71 presented toward the outer ends of the rubber sleeves 63 and toward the annular member 62 whereby to be engaged by said annular member when the rim assembly is tilted to a predetermined degree, thus acting to limit the rim assembly in its transverse oscillating movement.

At 72 and 73 are shown more or less flexible strips bridged across the gaps between the annular member 62 and the wear or abutment members 68 and 71, in order to prevent the entrance of dust, dirt, grit, oil and other foreign matter which would tend to fill up the gaps at the sides of the annular member 62, thus unduly restricting the lateral swinging motion of the rim assembly and also creating friction and undue wear between the parts.

In Fig. 2 a very similar arrangement is shown with a different type of hub 74 and hub flange 75 which is independent of the brake drum. A somewhat different type of cap or enclosing plate 76 is shown as being mounted over the hub and having an appropriate securing means 77 for permitting of the removal of the plate 76, which plate 76 is presented opposite to the hub flange 75 to receive the bolts 78 which pass through the various rubber sleeves 79. The wear plates or abutments are shown at 80 and 81 and the dust excluding strips at 82 and 83.

It is obvious that various changes and modifications may be made in the details of construction and design of the above specifically described embodiment of this invention without departing from the spirit thereof, such changes and modifications being restricted only by the scope of the following claim.

What is claimed is:

In a twin tired wheel, the combination of a hub, a hub flange having an abutment face, a wear plate on said abutment face, a cap also having an abutment face in spaced relation to the hub flange, said cap being removably fitted over the outer portion of the hub, a wear plate for the abutment face of said cap, bolts extending across from the hub flange to the cap, rubber sleeves fitted over said bolts, a rim assembly including a pair of road engaging tires and having circular openings receiving said rubber sleeves to support the rim assembly thereon, said rim assembly and rubber sleeves at the parts thereof between said wear plates being spaced at both ends from the wear plates to permit transverse flexing movement, and flexible strips extending from the rim assembly respectively to said hub flange and cap for excluding foreign matter from the joint adjacent said wear plates.

PIERRE MARCEL BOURDON.